Aug. 26, 1947.  R. K. JEFFREY  2,426,351
SPRING PRESSED OVERLOAD RELEASE CLUTCH
Original Filed Dec. 9, 1942
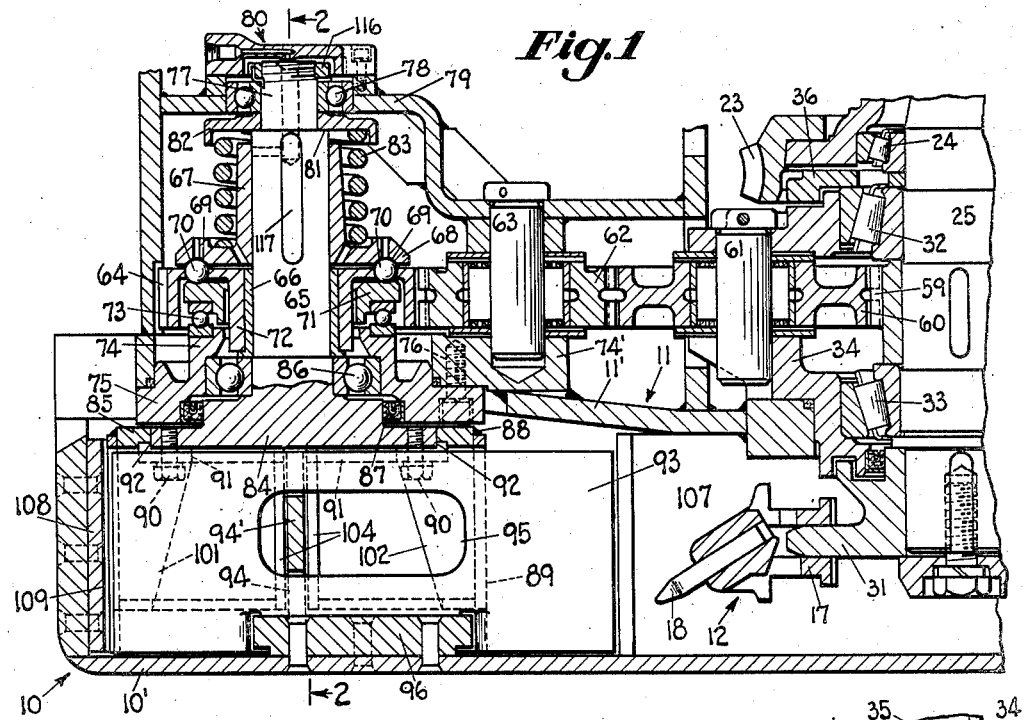

Patented Aug. 26, 1947

2,426,351

UNITED STATES PATENT OFFICE 2,426,351

SPRING PRESSED OVERLOAD RELEASE CLUTCH

Robert K. Jeffrey, deceased, late of Bexley, Ohio, by Florence H. C. Jeffrey, executrix, Bexley, Ohio, assignor, by mesne assignments, to The Jeffrey Manufacturing Company, a corporation of Ohio Original application December 9, 1942, Serial No. 468,398. Divided and this application March 30, 1944, Serial No. 528,720

1 Claim. (Cl. 64—29)

This invention relates to overload clutch mechanism for transferring a driving force from a gear or the like to a shaft or the equivalent; and an object of the invention is to provide an improved device of this class.

More particularly it is the object of the present invention to provide a spring-pressed slip clutch associated with power-transmission mechanism, and an anchorage on a supporting frame so as to relieve such power-transmission mechanism of pressure exerted by the spring of such clutch.

Other objects of the invention will appear hereinafter, the novel features and combinations being set forth in the appended claim.

In the accompanying drawings,

Fig. 1 is a sectional elevation of mining machine kerf-cutter driving mechanism connected by means of power transmission mechanism to cuttings removal mechanism and embodying my improvements;

Fig. 2 is a sectional elevation taken on the line 2—2 of Fig. 1, looking in the direction of the arrows; and Fig. 3 is a fragmentary sectional elevation taken transversely of the right-hand end portion of Fig. 1.

This application is a division of the co-pending application, Serial No. 468,398, filed December 9, 1942, now Patent Number 2,359,422, issued October 3, 1944, for an improvement in Mechanism for removing cuttings from the kerf cutter of a mining machine.

In the accompanying drawings, the improved clutch of my invention is illustrated as connected in a gear train of a mining machine and provides a slip clutch drive for cuttings removal mechanism 10 which is adapted to be detachably connected by means of cap screws 14 to the main frame 11 of a mining machine which includes the chain kerf cutter 12, only a portion of the complete mining machine being shown. In Fig. 2 the supporting frame of the cuttings removal mechanism is designated 10' and this frame may be welded to the extension 13 which is adapted to fit against the bottom plate 11', being held there by the cap screw 14 extending through the depending bracket 15 and threaded into the extension 13. The frame 10' may be thus detachably secured to the plate 11' at a plurality of spaced-apart points.

The chain kerf cutter 12 comprises a chain 17 provided with bits 18 and is adapted to be driven by an electric motor connected to the worm gear 23. The latter is mounted on the roller bearing 24 concentric with the vertical shaft 25. Connection of the worm gear 23 to the vertical shaft 25 may be controlled by means of a suitable clutch (not shown).

As shown in Fig. 1, the vertical shaft 25 is journaled by means of the roller thrust bearings 32 and 33 to the tubular support 34 which is secured to the frame 11 of the mining machine by means of cap screws 35. A retaining ring 36 is secured to the tubular support 34 by means of cap screws to hold the thrust bearings 32, 33 in adjusted positions.

Keyed to the vertical shaft 25 is a spur gear 59 as shown in Fig. 1. This spur gear 59 meshes with a larger spur gear 60 which is journaled on a vertical bearing 61. The gear 60 in turn meshes with a gear 62 journaled on the bearing 63, and the gear 62 meshes with the dished gear 64 which is concentric with the vertical shaft 65. The gears 59, 60, 62, and 64 are all preferably in the same horizontal plane. Gear 64 constitutes the power transferring or driving member of an overload releasing clutch of which shaft 65 is the driven or second power transferring member.

Secured to the spur gear 64 is a bushing 66 which is journaled loosely on the vertical shaft 65. Keyed to the upper portion of the shaft 65 and slightly slidably mounted thereon is a quill shaft or sleeve 67, the lower end of which is provided with a circular or annular extension 68 forming a spring abutment and having on the bottom thereof and near the periphery, a series of circularly arranged recesses 69 for receiving the balls 70, 70. These balls 70, 70 extend through a series of circularly arranged openings in the upper horizontal portion or web of the dished gear 64 and contact with the top of the thrust ring 71 which encircles the hub 72 of the gear 64, and is housed within the dished gear 64 as shown in Fig. 1. The ring 71 is supported by means of the ball thrust bearing 73 on the annular support 74 which extends upwardly from the annular frame member 75. By means of a series of circumferentially spaced cap screws 76, the annular member 75 is secured rigidly to the frame 11 of the mining machine and forms a part thereof, The upper end of the shaft 65 has a reduced extension 77 journaled by means of the ball bearing 78 in the horizontal upper plate 79 of the mining machine frame. Lubricating means 80 may be provided at the upper end of the shaft extension 77.

Journaled on the shaft extension 77 and resting on the annular shoulder 81 is a ring shaped cup or cap 82 for receiving the upper end of a helical compression spring 83, the lower end of which rests in an annular recess on top of the slidable abutment member 68.

The shaft 65 drives a cuttings removal mechanism, which will now be described, it being understood that said cuttings removal mechanism is only one illustration of the type of device which may be driven by my improved clutch.

The lower end of the vertical shaft 65 is provided with a circular plate 84 which fits into the ring 85. Between the lower end of the shaft 65 at the top of the plate 84 and the supporting ring 75 is a ball bearing 86. A circular lubricant sealing ring 87 intervenes the upper central portion of the plate 84 and the ring 75.

The ring 85 has welded thereto at 88 a cylinder 89, the lower end of which is open and located closely adjacent the inner upper surface of the plate 10' forming a part of the supporting frame of the cuttings removal mechanism. By means of cap screws 90, 90 extending through the ring sections 91 and threaded into the circular plate 84, the ring 85 is supported at the annular recess 92. In other words, the inner annular recess in the ring 85 at 92 co-operates with the periphery of the ring 84 to form a groove for receiving the annular upwardly extending extensions from the ring sections 91.

The cylinder 89 and the mechanism for supporting the same constitutes a drum closed at the top by the plate 84 which rotates therewith and closed at its bottom by the relatively stationary plate 10'. The cylinder 89 is provided with four vertical slots spaced apart 90° from each other. Extending through these vertical slots are flights 93 and 94. The flight 93 is provided with an elongated opening 95 of sufficient length to have extended therethrough the other flight 94 when held in a horizontal position. The flight 94 has a central portion 94' adapted to move freely back and forth through the opening 95 when the flight 94 is vertical.

Riveted to the bottom plate 10', as shown in Fig. 1, is a cam 96 having an approximately elliptical shape. Each of the flights 93 and 94 is provided with cut-away portions to provide inner opposing curved edges for engaging the periphery of the cam 96. The flight plate 93 is provided with the lower opposing curved engaging edges for engaging opposite sides of the cam 96. The flight 94 is provided with lower inner oppositely facing curved edges for engaging opposite faces of the cam 96. It should be noted that in the periphery of the cylinder 89 of the drum are located guiding plates 101, 101 for one end portion of the flight 93, and guide plates 102, 102 for the other end portion of the flight 93. In a similar manner, guide plates 103, 103 are provided for one end portion of the flight 94, and plates 104, 104 for the other end portion of the flight 94. Each of the guide plates may be welded at their outer vertical edges to the edges of the vertical slots in the cylinder 89, and these guide plates may be wider at their upper ends than at their lower ends, as indicated by the dotted lines in Figs. 1 and 2.

A vertical deflector plate 107 welded to the frame of the mining machine has the shape of a segment of a cylinder and extends vertically from the bottom plate 10' in a position close to the path of travel of the outer end of each of the flights. Consequently the flights 93 and 94 are extended to a maximum extent when closest to the chain cutter. As each flight continues to rotate, it acts positively on the cuttings to sweep them rearwardly and off the bottom plate 10'. At the same time each flight recedes into the drum as it approaches the abutment 108, the inner surface of which at 109, has the shape of a segment of a cylinder concentric with the cylinder 89 or the axis of rotation of the drum. It will thus be seen that the periphery of the cylinder 89 may be located in close proximity to the inner surface 109 of the abutment 108. The height of the abutment 108 is approximately coextensive with the height of each of the flights 93 and 94. Consequently practically no cuttings will be carried past the abutment 108 back toward the kerf cutter. Furthermore, the vertical edge 110 of the abutment 108 may be sufficiently sharp to scrape from the outer surface of the cylinder 89 such material as may be clinging thereto. Moreover, the flights may have a sufficient fit between the plates along which they slide that such material as may cling to the outer surfaces of the flights may be wiped off when the flights recede into the drum.

If either flight 93 or 94 should meet an obstruction which might cause part of the mechanism to break, the spring 83 will be compressed intermittently as the plate 68 travels over the balls 70, 70 and gives the signal by the noise produced that the operation of the machine should be discontinued and the obstruction removed.

It should be particularly noted that by reason of the flights 93 and 94 being projected from diametrically opposite sides of the drum cylinder 89, the rapidity of the sweeping of the cuttings is sufficient to render the cuttings removing mechanism so efficient that during each half rotation of the drum the cuttings are removed and deposited where the tendency is reduced to a minimum for the coal cuttings to be moved back toward the kerf cutter. That is to say, instead of having each flight extend outwardly to a maximum extent once during each rotation of the drum, it is extended out from the drum to a maximum extent twice during each rotation of the drum. By referring to Fig. 1 it can be seen that while the right-hand end of the flight 93 is moving through 180°, the other end is at the same time moving through only 180° to reach its maximum projection from the drum. Thus the capacity for removing cuttings is increased two-fold by having the opposite ends of each flight project from the drum and each acting to take the place of the other during each 180° of rotation of the drum cylinder 89.

The flights 93 and 94 may rest by gravity partly on the upper surface of the plate 10' and partly on the upper surface of the cam plate 96, but it is preferred to space those portions of the flights 93, 94 that overhang the cam 96, slightly from the upper surface of the plate 10' and have the flights rest by gravity on the upper surface of the cam 96 since the latter is always inside the cylinder 89 and therefore relatively free from cuttings or foreign material. The flights 93 and 94 are therefore supported on the upper surface of the cam 96 and can slide freely thereon when rotated since such upper surface is much cleaner than the upper surface of the plate 10'.

However, the lower edge of the cylinder 89 is in close proximity to the plate 10' and the flights 93, 94 fit closely in the slots in this cylinder. The cylinder constitutes a cylindrical abutment, or the drum above referred to may be considered the rotating abutment, whereas the abutment 108 is stationary.

It should be particularly noted that if the flights 93, 94 become worn they may readily be renewed after detaching the plate 10' from the frame of the mining machine, by removing the plurality of cap screws.

Since the slots in which the flights 93, 94 are slidable are open at their lower ends, these flights can readily be permitted to drop out from the drum cylinder 89 without removing the cap screws 90, 90. When the flights have been removed they may be taken apart by rotating one 90° relatively to the other so that the flight 94 may be moved out of the opening 95. When assembling a new pair of flights they are first placed at right angles to each other and then moved upwardly into the slots in the cylinder 89 and the cam 96 replaced by securing the plate 10' to the mining machine frame. The flights are then again interlocked by the slots in the cylinder 89 and each flight may be reciprocated freely in its own plane without interference from the other, on account of the narrow portion 94' of flight 94 extending through the elongated or rectangular opening 95 in the flight 93.

Reverting to the ball clutch, it should be noted that the downward thrust of the spring 83 is exerted through the clutch balls 70 and ball thrust bearing 73 onto the annulation 74 of the annular supporting member 75 that is secured rigidly to and forms a part of the frame of the mining machine. The gear 64 is thus relieved of the thrust from the spring 83 and when the gear 64 rotates the ball clutch mechanism rotates therewith as a unit with the ball bearing 73 at the lower end of such unit and the ball bearing 78 at the upper end thereof.

It should be particularly noted that when the ground engaging pan 10' is detached by removing the various screws 14, one of which is shown in Fig. 3, the elliptical cam 96 is separated from the flights 93, 94 so that the latter may be removed from the drum 89 by sliding them out of the slots in the latter since these slots are open at their lower ends.

The ring 85 together with the drum 89 may be disconnected from the disc 84 by removing the screws 90, 90. Welded to the bottom plate 11' of the main frame 11 is a supporting ring 74'. The diameter of the opening in this ring 74' is greater than the diameter of the gear 64 and consequently when the supporting screws 76, 76 are removed from the ring 74', the entire slip clutch unit may be dropped out of the interior of the frame 11 through the ring 74'.

When the apparatus shown in Figs. 1 and 2 is to be reassembled, the gear 64 is first brought back into mesh with the gear 62 by fitting the annular supporting member 75 into re-engagement with the ring 74' whereupon the screws 75, 76 are reinserted to hold the parts in assembled relation with the gear 62 in mesh with the gear 64. The downward force exerted by the spring 83 will then be resisted by ring 74 which is now rigidly connected to the main frame 11.

The ring 85 and the drum 89 may then be reassembled in connection with the disc 84 by replacing the screws 90, 90. Now by placing the flights 93, 94 in right-angled relation, they may be slid into the slots in the drum 89. Finally the cam 96 may be brought into engagement with the flights 93, 94 by replacing the screws 14 to connect the pan 10' to the main frame 11. It will thus be seen that when the slip clutch unit and the parts associated therewith are assembled, the flights 93, 94 will rest on the cam 96 for support thereby, and the drum 89 being rigidly connected to the shaft 65 may be arranged to be supported by the ball bearings 73 and 86.

The upper end of the spring 83 presses against an abutment provided by the shallow cup 82 which in turn abuts against the inner race of the ball bearing 78. The upper extension 77 of the shaft 65 is of reduced diameter to afford the annular shoulder 81 engaged by the cup 82. The shaft extension 77 is screw-threaded at its upper end to receive the nut 116 which may be relied on to keep the inner race of the ball bearing 78 in place on the extension 77 by clamping this inner race against the cup 82 and the latter against the shoulder 81 and thus rigidly secured to shaft 65.

The upward thrust on shaft 65 imparted by spring 83 is transferred to the annular supporting member 75 of the frame 11 through the bearing 86, the upper edge of the outer race of which abuts a shoulder thereof.

Downward pressure or thrust of the spring 83 is against the pressure plate or disc 68 and thence through the circumferential spaced balls 70 through the top openings in the gear 64 onto the ring 71 to the ball thrust bearing 73 being ultimately taken by support 74 and frame member 75. When the kerf cutter 12 is driven, the gears 59, 60, 62 and 64 are operated to rotate the gear 64, which, except for the clutch member, is mounted loosely on the vertical shaft 65. The balls 70 fitting in the recesses 69 transmit rotary movement from the gear 64 to the pressure plate or disc 68 which is integral with the sleeve 67. Since the sleeve 67 is keyed at 117, 117 to the shaft 65, the latter will be rotated when the pressure plate or disc 68 is rotated.

It will thus be seen that the lower end of the spring 83 is seated on the main frame by means of the balls 70, the ring 71, the ball thrust bearing 73, annular supporting member 75 and the ring supports 74, 74'. The upper end of the spring is seated against the cup 82. Cup 82 is rigidly attached to shaft 65 and the upward thrust of spring 83 is transferred through shaft 65 and bearing 86 to frame member 75, as previously set forth.

The shaft 65 and the parts carried thereby being thus resiliently supported on the main frame, the stresses and strains on the ball bearings 78 and 86 during operation of the cuttings removal mechanism, may be reduced to a minimum to free the latter sufficiently to greatly facilitate rotation of the shaft 65.

By removing the screws 76, 76 from the ring support 74', the shaft 65 and the parts associated therewith may be removed as a unit. That is to say, the assembly of the shaft 65, the disc 84, the ring support 74, the ball bearing 86, the gear 64, the slip clutch and the supports for the latter may be removed from the supporting frame 11 as a unit, by sliding the outer race of the ball bearing from the plate 79 and by sliding the gear 64 out of mesh with the gear 62, the diameter of the opening in the ring 74' being sufficient for this purpose. Such removal of this unit has the advantage of facilitating repair and replacement of parts, particularly those which receive the greatest wear, such as the sleeve and disc element 67, 68.

Obviously those skilled in the art may make various changes in the details and arrangement of parts without departing from the spirit and scope of the invention as defined by the claim hereto appended, and it is therefore preferred not to be restricted to the precise construction herein disclosed.

Having thus described and shown an embodiment of the invention, what it is desired to secure by Letters Patent of the United States is:

In a device of the class described, the combination with a shaft, of a gear journaled on said shaft, a spring-pressed slip clutch connecting said gear and said shaft and including thrust means acting on a series of circumferentially spaced balls extending through openings in said gear, a support for said shaft, and means for receiving the thrust through said balls and transferring it to said support.

FLORENCE H. C. JEFFREY,
*Executrix of the Estate of Robert K. Jeffrey, Deceased.*

REFERENCES CITED

The following references are of record in the file of this patent:

UNITED STATES PATENTS

| Number | Name | Date |
|---|---|---|
| 1,877,440 | Adatte | Sept. 13, 1932 |
| 865,486 | Gannon | Sept. 10, 1907 |
| 2,278,119 | Richards | Mar. 31, 1942 |
| 2,320,004 | McCullough | May 25, 1943 |
| 2,268,260 | Mavor | Dec. 30, 1941 |
| 2,320,307 | Saville | May 25, 1943 |
| 1,883,164 | Vassakos | Oct. 18, 1932 |
| 1,904,375 | Kind | April 18, 1933 |
| 2,072,924 | Smyth, Jr. | Mar. 9, 1937 |
| 2,291,407 | Paul | July 28, 1942 |

FOREIGN PATENTS

| Number | Country | Date |
|---|---|---|
| 37,763 | France | 1931 |